(12) United States Patent
Matson

(10) Patent No.: US 6,841,379 B2
(45) Date of Patent: Jan. 11, 2005

(54) CONDUCTIVE MICROPLATE

(75) Inventor: Robert S. Matson, Orange, CA (US)

(73) Assignee: Beckman Coulter, Inc., Fullerton, CA (US)

( * ) Notice: Subject to any disclaimer, the term of this patent is extended or adjusted under 35 U.S.C. 154(b) by 0 days.

(21) Appl. No.: 10/146,004

(22) Filed: May 15, 2002

(65) Prior Publication Data
US 2003/0215937 A1 Nov. 20, 2003

(51) Int. Cl.⁷ .............................................. C12M 1/34
(52) U.S. Cl. .............................. 435/287.2; 435/288.4; 435/817; 435/173.1; 204/403.01; 204/403.03
(58) Field of Search ............................ 435/173.1, 817, 435/287.2, 288.4; 204/403.01, 403.03

(56) References Cited

U.S. PATENT DOCUMENTS

| | | | |
|---|---|---|---|
| 4,877,745 A | 10/1989 | Hayes et al. | 436/166 |
| 5,126,025 A | 6/1992 | Carson et al. | 204/180.1 |
| 5,583,211 A | 12/1996 | Coassin et al. | 536/23.1 |
| 5,605,662 A | 2/1997 | Heller et al. | 422/68.1 |
| 5,632,957 A | 5/1997 | Heller et al. | 422/68.1 |
| 5,653,939 A | 8/1997 | Hollis et al. | 422/50 |
| 5,756,207 A | 5/1998 | Clough et al. | 428/375 |
| 5,807,522 A | 9/1998 | Brown et al. | 422/50 |
| 5,849,486 A | 12/1998 | Heller et al. | 435/6 |
| 5,851,772 A | 12/1998 | Mirzabekov et al. | 435/6 |
| 5,929,208 A | 7/1999 | Heller et al. | 530/333 |
| 5,965,452 A | 10/1999 | Kovacs | 436/149 |
| 6,015,880 A | 1/2000 | Baldeschwieler et al. | 530/333 |
| 6,017,696 A | 1/2000 | Heller | 435/6 |
| 6,048,690 A | 4/2000 | Heller et al. | 435/6 |
| 6,051,380 A | 4/2000 | Sosnowski et al. | 435/6 |
| 6,083,763 A | 7/2000 | Balch | 436/518 |
| 6,110,669 A | 8/2000 | Milton | 435/6 |
| 6,146,833 A | 11/2000 | Milton | 435/6 |
| 6,208,893 B1 | 3/2001 | Hofmann | 604/21 |
| 6,218,126 B1 | 4/2001 | Yasuda et al. | 435/6 |
| 6,225,059 B1 | 5/2001 | Ackley et al. | 435/6 |
| 6,232,066 B1 | 5/2001 | Felder et al. | 435/6 |
| 6,238,869 B1 | 5/2001 | Kris et al. | 435/6 |
| 6,254,827 B1 | 7/2001 | Ackley et al. | 422/68.1 |
| 6,268,141 B1 | 7/2001 | Matson et al. | 435/6 |
| 6,287,517 B1 | 9/2001 | Ackley et al. | 422/68.1 |

OTHER PUBLICATIONS

Cheng et al. *Nature Biotech 16*, 541–546, 1998.

*Primary Examiner*—David A. Redding
(74) *Attorney, Agent, or Firm*—Hoaan & Hartson LLP

(57) ABSTRACT

A conductive microplate device for the detection of target biomolecules in a sample is described. The microplate comprises an assembly of a porous substrate and a conductive layer, wherein the assembly is sealed into bottom of at least some wells of the microplate. The porous substrate has a top surface and a bottom surface. The top surface comprises a plurality of covalently attached probe biomolecules. The covalently attached probe biomolecules are reactive with the target biomolecules contained in the sample. The conductive layer, which is attached to the bottom surface of the porous substrate, is adapted to receive voltage. Microplates of the present invention can be easily adapted for use with robotic workstations. Accordingly, in one embodiment, the power supply is incorporated into a robotic arm tool for fast microplate processing.

31 Claims, 8 Drawing Sheets

CONDUCTIVE MICROPLATE

AREA OF THE ART

The present invention generally relates to devices for concurrently performing multiple assays. Specifically, the present invention relates to microplate devices containing active electrodes for the attraction of biomolecular target analytes. The invention also relates to methods of making and using such devices.

DESCRIPTION OF THE PRIOR ART

Many contemporary methods of molecular biology, including nucleic acid hybridization analysis and protein binding analysis, utilize "biochips" or arrays of probe biomolecules ("probes") to bind and detect target biological species ("targets") in complex sample systems. Most commonly in these methods, a sample is simply placed onto the surface of the array and targets contained in the sample passively diffuse toward and bind with the probes immobilized on the support. Examples of commercially available microarrays utilizing passive diffusion principle include GENECHIP® arrays manufactured by Affymetrix (Santa Clara, Calif.) and GEM™ arrays manufactured by Synteni (Fremont, Calif.).

Although effective when dealing with samples of high volume and high target content, such arrays are diffusion-limited in samples with a low target concentration. Consumers typically deal with this limitation either by extending incubation time to 15–20 hours or longer in order to capture low abundant targets or by manipulating their samples prior to the testing to increase concentration of the targets. For example, the number of target DNA copies in a sample can be amplified using polymerase chain reaction. Alternatively, a larger number of cells can be used to prepare a sample with a higher level of target biomolecules.

However, extending the hybridization time presents a serious bottleneck for high throughput and ultra high throughput sample processing. The use of large cell populations may increase the likelihood of including other cell types that are not representative of the target biomolecule. Additionally, amplification involves complex and lengthy procedures and can introduce significant bias by over-amplification of low abundant species. Also, not all species are amplified to the same extent, due to differences in primer-target annealing. Accordingly, cost, convenience, and flexibility limit the diffusion-based approach.

Recently, Nanogen, Inc. (San Diego, Calif.) has proposed an alternative approach to the detection of low copy targets in samples (U.S. Pat. Nos. 5,605,662; 5,632,957; 5,965,452; 5,849,486; 5,929,208; 6,017,696; 6,048,690; 6,051,380; 6,225,059; 6,287,517). By providing an electrical charge to a particular area of an array device, charged target biomolecules are forced to move toward and concentrate on that area. As a result, probe biomolecules bind target biomolecules more rapidly and efficiently as compared to the passive diffusion methods discussed above.

The electronic array devices developed by Nanogen typically include a current, voltage or power source, an electrode coupled to the source, a permeation layer formed on one surface of the electrode, and a biologic attachment layer formed upon the permeation layer. The permeation layer provides for free transport of small counter-ions between the electrode and a solution, and the attachment layer provides for coupling of specific binding entities (U.S. Pat. No. 5,965,452). One of such electronic array devices is available commercially under NANOCHIP™ trademark.

Although electronic array devices developed by Nanogen significantly increase the probe-target binding rate, these arrays do not lend themselves to high throughput screening (HTS) applications. The electronic array devices of Nanogen are bulky, expensive, and difficult to control. They also have a very limited probe biomolecule density and are not capable of processing thousands of samples per day as typically required by HTS.

SUMMARY OF THE INVENTION

In view of the above-noted shortcomings of the conventional array systems, it is an object of the present invention to provide inexpensive array devices for fast and efficient binding of unamplified or amplified biomolecules. It is particularly desirable to provide inexpensive array devices having sufficiently high probe biomolecule density and suitable for HTS format of sample analysis. It is another object of the present invention to provide methods of making and using such array devices.

These and other objects are achieved in the present invention by utilizing a conductive microplate device for the detection of target biomolecules in a sample. The microplate of the present invention comprises an assembly of a porous substrate and a conductive layer, wherein the assembly is sealed into the bottom of at least some wells of the microplate.

The porous substrate has a top surface and a bottom surface. The top surface comprises a plurality of covalently attached probe biomolecules. The covalently attached probe biomolecules are reactive with the target biomolecules contained in the sample. The conductive layer, which is attached to the bottom surface of the porous substrate, is adapted to receive voltage.

In one embodiment, the top surface of the porous substrate further comprises a plurality of activated pendant functional groups reactive with probe biomolecules. In this embodiment, a plurality of probe biomolecules covalently attached to the pendant functional groups. Preferably, the activated pendant functional groups are acyl fluoride groups. Most preferably, the probe biomolecules are attached at discrete locations on the top surface of the porous substrate, whereby an array is formed.

Another aspect of the present invention includes a device comprising the above-described conductive microplate and a power supply for supplying voltage to the microplate. Microplates of the present invention can be easily adapted for use with robotic workstations. Accordingly, in one embodiment, the power supply is incorporated into a robotic arm tool for fast microplate processing.

Another aspect of the present invention is directed to a method of forming a conductive microplate with a plurality of wells. The method comprises the steps of:

(a) providing a porous substrate with a top surface and a bottom surface;

(b) activating the top surface with reactive functional groups capable of covalent attachment of probe biomolecules;

(c) contacting the top surface with probe biomolecules under conditions sufficient for covalent attachment of probe biomolecules to reactive functional groups;

(d) attaching a conductive layer to the bottom surface of the porous substrate; and (e) sealing the porous substrate with attached conductive layer into the bottom of at least some wells of the microplate, wherein the conductive layer is adapted to receive voltage.

In another aspect, the present invention provides a method of hybridizing target biomolecules to probe biomolecules. The method comprises:

(a) providing the conductive microplate of the present invention, wherein the conductive layer forms a first electrode and the microplate further comprises a second electrode in an electrical contact with the first electrode through an electrolyte solution;

(b) introducing labeled target biomolecules into the electrolyte solution; and (c) applying an electrical voltage between the first and the second electrode, whereby the labeled target biomolecules hybridize with the probe biomolecules on the surface of the porous substrate.

The present invention offers many economic and technical advantages over the conventional devices. The present invention discloses electrophoretic concentration of biomolecular targets in microplate format. Although the microplate footprint is universally accepted as the standard format for HTS, the fabrication of a microplate using conventional microelectronics devices such as NANOCHIPS™ to increase target binding rates would be prohibitively expensive, particularly when the single use consumable microplates are desired.

The microplates of the present invention, on the other hand, are constructed by activating and sealing an inexpensive porous conductive substrate into the bottom of microplate wells. Therefore, the conductive microplates of the present invention present an inexpensive, simple, and reliable alternative to conventional array devices.

The conductive microplates of the present invention are suitable for the fast and efficient binding of unamplified or amplified biomolecules. For example, conductive microplates of the present invention are suitable for ultra-fast hybridization of nucleic acids to microarrays in a number of HTS applications, including drug development and gene-based diagnostics.

Moreover, in a preferred embodiment of the present invention, a porous substrate is activated with acyl fluoride groups. Those skilled in the art will appreciate the advantages of acyl fluoride chemistry. Acyl fluoride groups are relatively resistant to reactions with water ("Peptide Synthesis via Amino Acid Fluorides," Carpino, L., Beyerman, M., Wenschuh, H. & Bienert, M.: Acc. Chem. Res.: 29, 268–74, 1996), but are highly reactive with nitrogen and/or oxygen nucleophiles. This high reactivity combined with stability under aqueous conditions makes acyl fluoride activation chemistry particularly attractive to bioarray applications, because it provides an extended shelf life prior to and after immobilization of probe biomolecules. Finally, the acyl fluoride activated substrates can bind both modified and unmodified probe biomolecules. Since modification of biomolecules is not required, a substantial, up to 50%, reduction in the cost of reagents may be achieved.

The above-mentioned and other features of this invention and the manner of obtaining them will become more apparent, and will be best understood, by reference to the following description, taken in conjunction with the accompanying drawings. These drawings depict only a typical embodiment of the invention and do not therefore limit its scope.

DETAILED DESCRIPTION OF THE INVENTION

Nucleic acid hybridization rates and rates of other biomolecule-binding processes greatly depend on concentration of reactants. When the concentration of reactants is low, the number of collisions between the reacting molecules is low, and, thus, the reaction occurs slowly.

It has been observed that electromotive forces can be used to move charged biomolecules through a variety of media. Several conventional analytical processes, such as electrophoresis, electroblotting, and isoelectric focusing, utilize this physical phenomena.

Figure 1:
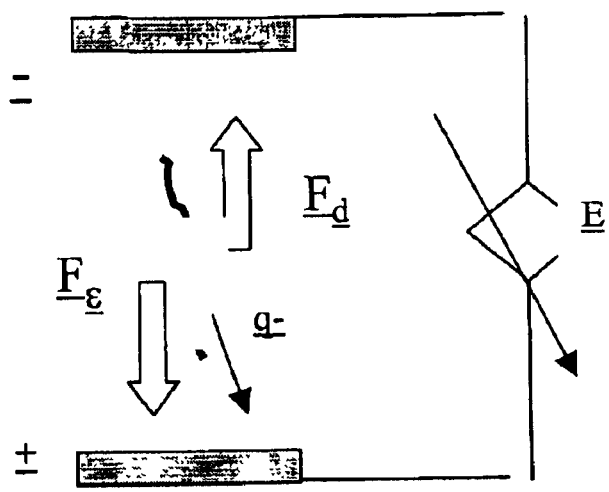
FIG. 1 is a diagram illustrating forces affecting the movement of a negatively charged molecule in an electrical field.

As illustrated in FIG. 1, a molecule of net charge q within an applied external electrical field strength E will experience an electric field force $F_e$, such that the molecule is influenced by that force according to the following relationship (1):

$$F_e = q \times E \tag{1}$$

Opposing the acceleration of the molecule under the electric field force is friction. This can be defined as a drag force $F_d$ which is proportional to the velocity V of the molecule and its frictional coefficient f:

$$F_d = f \times V \tag{2}$$

As the charged molecule moves toward an oppositely charged electrode, a steady-state velocity is achieved when $F_e = F_d$. A steady-state velocity at unit field strength is an electrophoretic mobility $\mu$ of a molecule:

$$\mu = q/f \tag{3}$$

In case of DNA, both the frictional coefficient f and total net charge q are directly proportional to the size of a biomolecule (N, base pairs) or:

$$\mu = q/f \sim N/N \tag{4}$$

Thus, for nucleic acids, the electrophoretic mobility $\mu$ essentially remains constant with changes in molecular size (1992, *Capillary Electrophoresis: Theory & Practice*, Grossman, P D and Colburn, J C (eds.), pp. 111–120, Academic Press, San Diego). This means that DNA molecules will travel at approximately the same rate within an applied electric field. The same holds true for other charged biomolecules, such as SDS-proteins, where a constant ratio of net charge to the frictional coefficient is maintained. The conductive microplate of the present invention allows to rapidly move charged biomolecules out of solution without appreciable molecular separation and to concentrate these near the substrate surface. This can be best accomplished by using free-solution electrophoresis over very short distances.

Figure 2B:
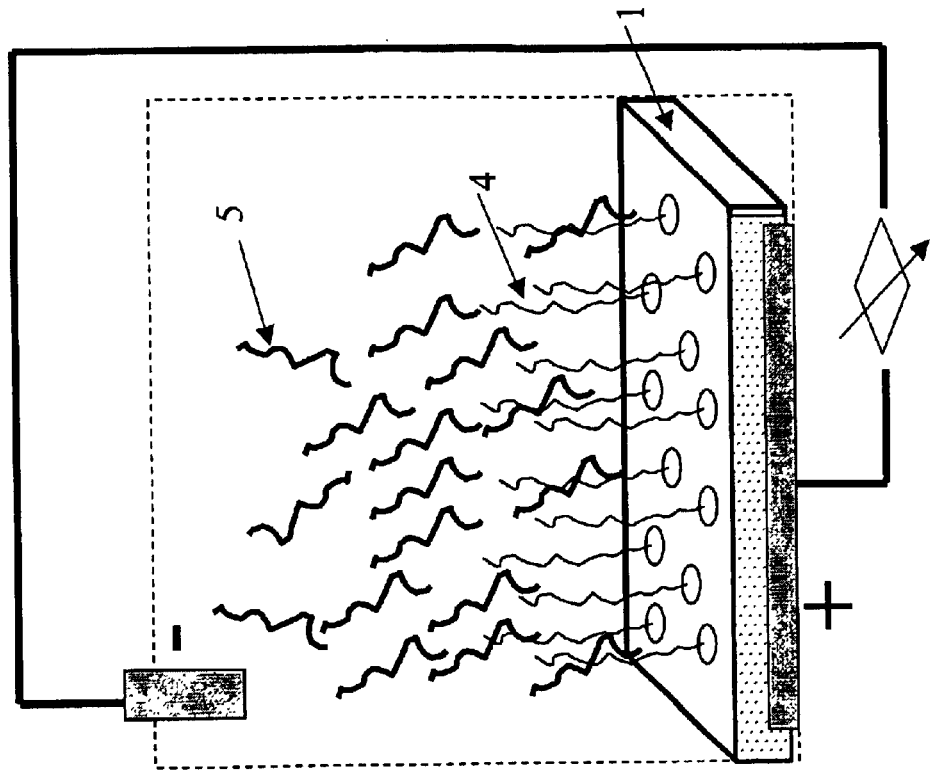
FIGS. 2a and 2b illustrate the advantage of electrokinetic hybridization scheme (FIG. 2b) over diffusion-based DNA/RNA hybridization (FIG. 2a).
Figure 2A:
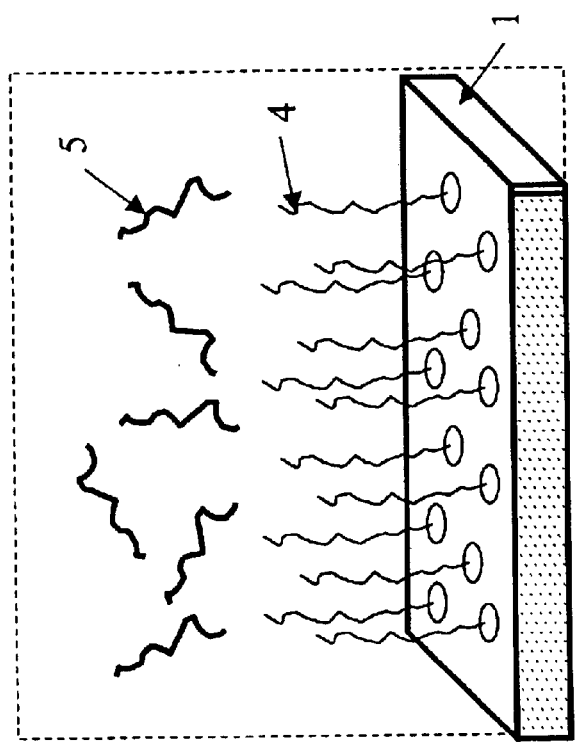

The electrophoretic movement of charge-bearing molecules in free solution is easily accomplished. Under appropriate conditions, such molecules can be concentrated at or near an electrode surface. For example, FIG. 2a demonstrates the concentration-dependent diffusion of the target DNA 5 toward the hybridization substrate 1. However, after voltage is applied, as shown in FIG. 2b, diffusion is strongly biased and target DNAs 5 are drawn toward the hybridization substrate 1.

The tethering of complementary DNA near the electrode surface and its rapid hybridization with probe DNA attached to the electrode surface has been demonstrated by Nanogen in a context of microchip-based hybridization arrays (U.S. Pat. Nos. 5,605,662; 5,632,957; 5,965,452; 5,849,486; 5,929,208; 6,017,696; 6,048,690; 6,051,380; 6,225,059; 6,287,517). Such active microelectronic devices are capable of rapid transport and concentrating nucleic acids over selected regions and, thus, have a higher (30- to 40-fold) rate of hybridization as compared to diffusion-based arrays. However, conventional microelectronic devices are not capable of processing the thousands of samples per day as required in high throughput screening (HTS) applications.

Figure 3:
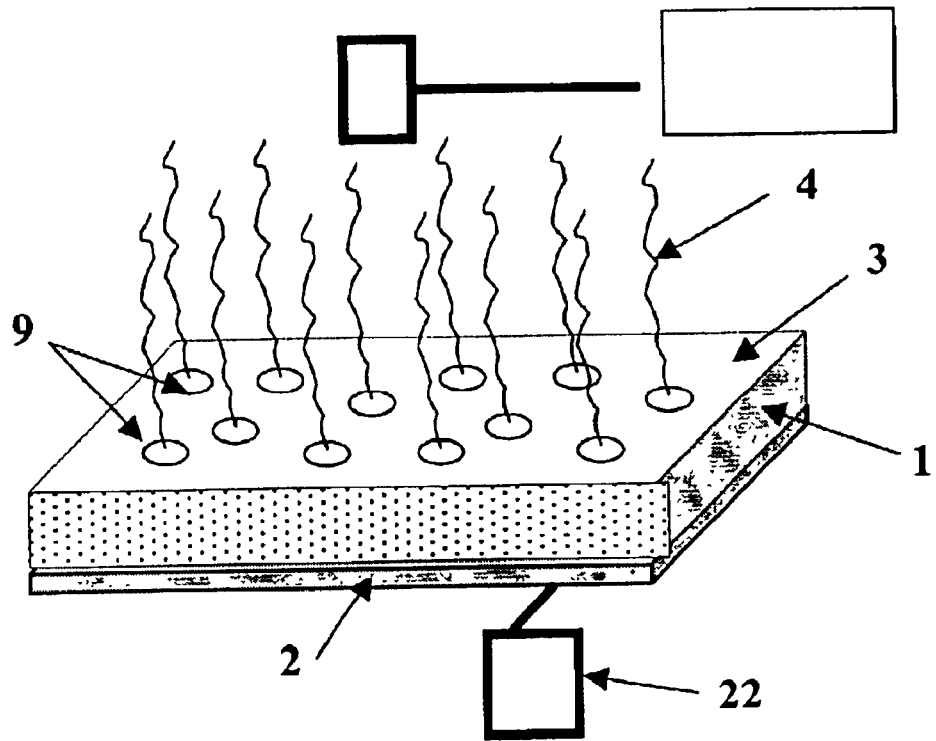
FIG. 3 shows an assembly of a porous substrate with a conductive layer.
Figure 8:
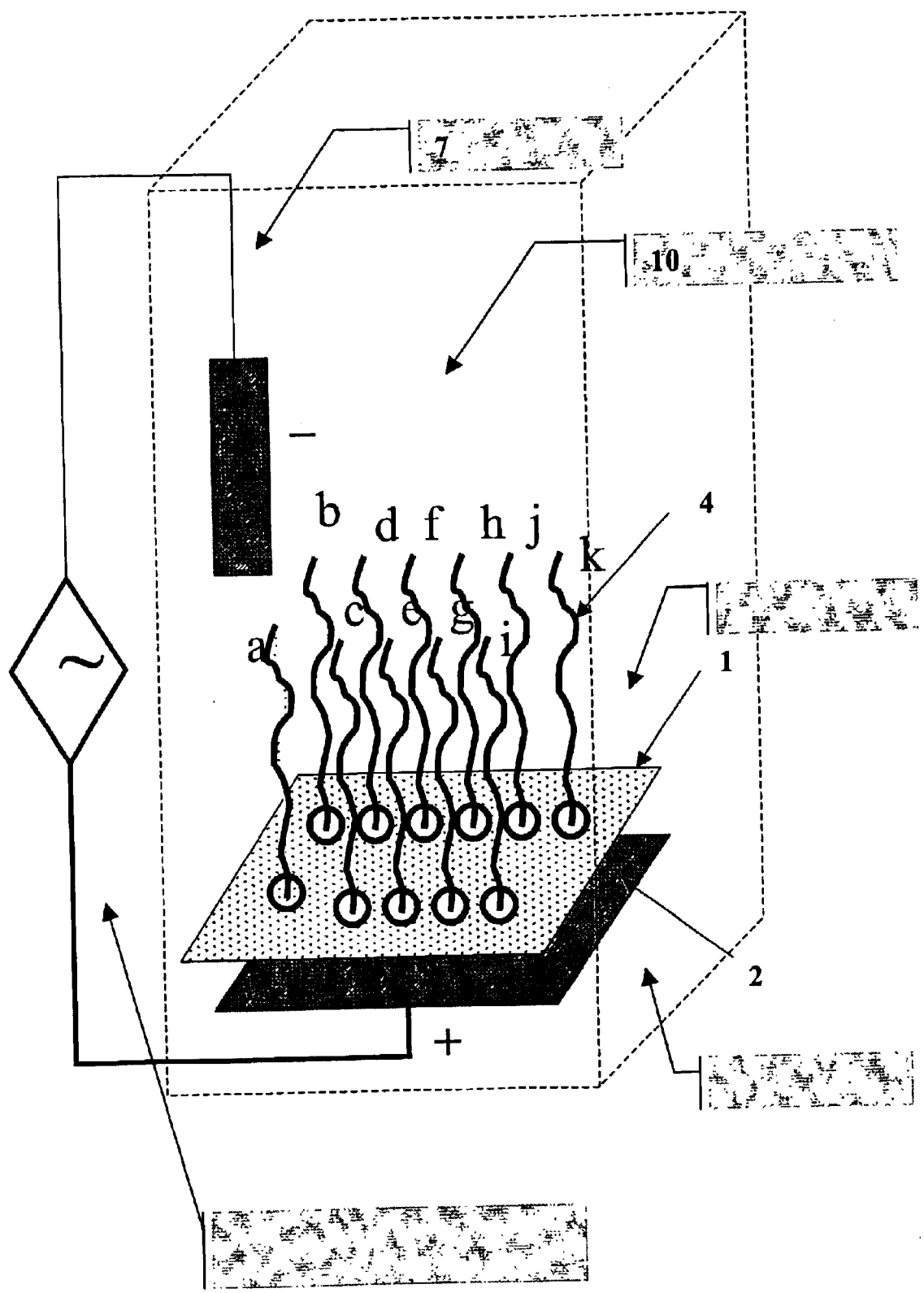
FIG. 8 shows the microplate assembly of the present invention prior to the beginning of DNA hybridization.
Figure 9:
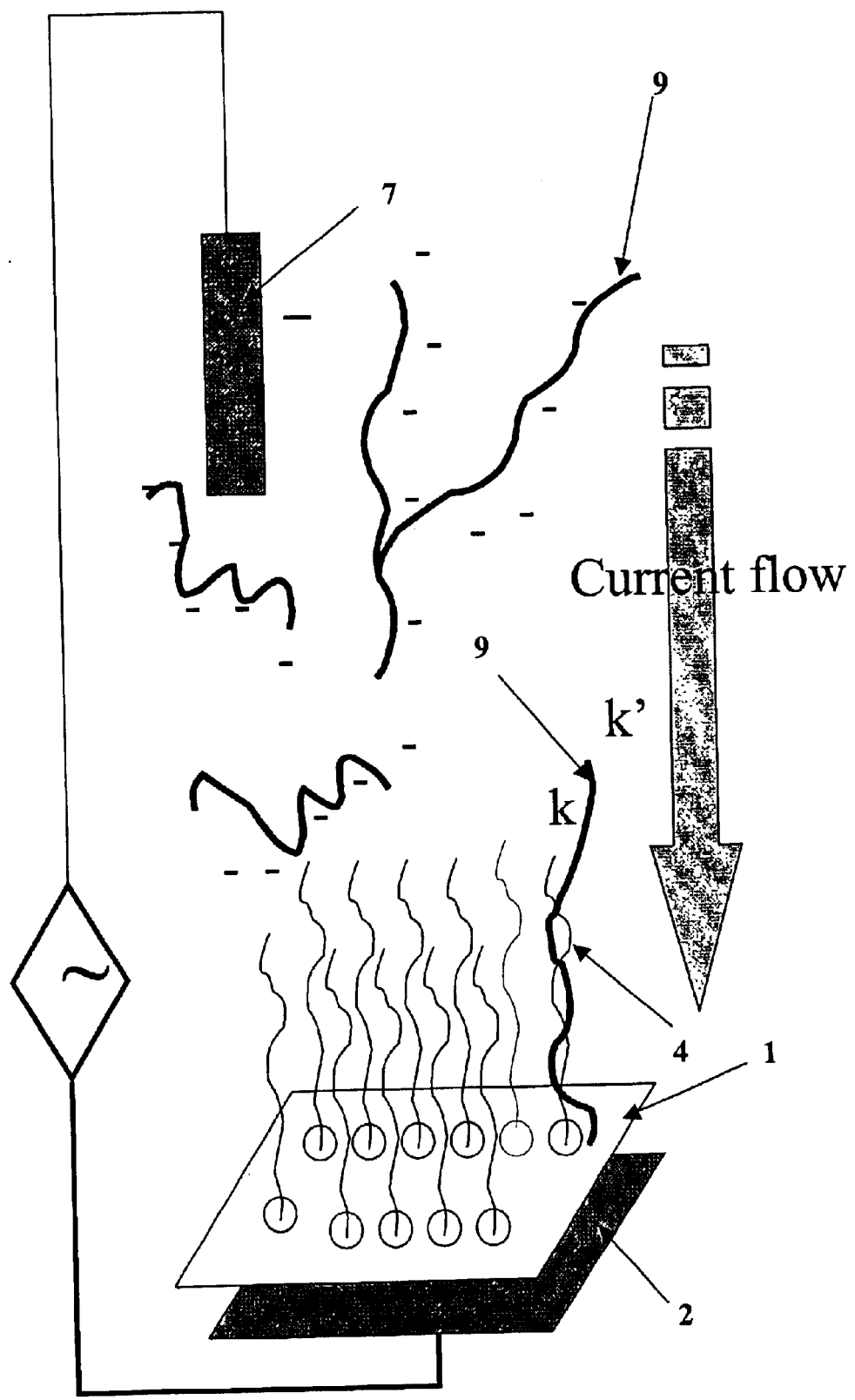
FIG. 9 shows the microplate assembly of FIG. 8 during DNA electrophoresis (binding of target DNA k' to the corresponding probe DNA k is demonstrated).

Referring to FIGS. 3, 8, and 9, one aspect of the present invention is directed to a conductive microplate device for the detection of target biomolecules 9 in a sample. The microplate of the present invention comprises an assembly of a porous substrate 1 and a conductive layer 2, wherein the assembly is sealed into the bottom of at least some wells of the microplate. There are a number of ways in which the substrate assembly may be sealed as will be explained below in the Microplate Construction section.

The porous substrate has a top surface 3 and a bottom surface. The top surface 3 comprises a plurality of covalently attached probe biomolecules 4. The covalently attached probe biomolecules 4 are reactive with the target biomolecules 9 contained in the sample. For example, FIG. 9 shows one of the target biomolecules 9, biomolecule k', hybridized to the corresponding probe biomolecule k (one of the probe biomolecules 4). The conductive layer 2, which is attached to the bottom surface of the porous substrate, is adapted to receive the voltage from a power supply 22.

The term "biomolecule," as used herein, refers to nucleic acids, polynucleotides, polypeptides, proteins, carbohydrates, lipids, their conjugates, haptens, and analogues thereof. As used herein, "polynucleotide" refers to a polymer of deoxyribonucleotides or ribonucleotides, in the form of a separate fragment or as a component of a larger construction. "Polynucleotide," as used herein, may be DNA, RNA, a DNA analog such as PNA (peptide nucleic acid), or a synthesized oligonucleotide. The DNA may be a single- or double-strand DNA, or a DNA amplified by PCR technique. The RNA may be an mRNA. The length of the polynucleotides may be 3 bp to 10 kb. In accordance with one embodiment of the present invention, the length of a polynucleotide is in the range of about 50 bp to 10 kb, preferably, 100 bp to 1.5 kb. In accordance with another embodiment of the present invention, the length of a synthesized oligonucleotide is in the range of about 3 to 100 nucleotides, preferably 25 nt to 75 nt. In accordance with a further embodiment of the present invention, the length of the oligonucleotide is in the range of about 15 to 20 nucleotides.

As used herein, the term "polypeptide" refers to a polymer of amino acids, wherein the α-carboxyl group of one amino acid is joined to the α-amino group of another amino acid by a peptide bond. A protein may comprise one or multiple polypeptides linked together by disulfied bonds. Examples of the protein include, but are not limited to, antibodies, antigens, ligands, receptors, etc.

Target biomolecules can be any charge-bearing molecules. Charge-bearing molecules include native biomolecules that contain charged groups, and biomolecules that have been derivatized with electrically charged groups. Those skilled in the art will recognize that in addition to chemical derivatization, biomolecules can be charged by manipulation of the pH of the sample solution.

1. Selection of Substrate and Surface Chemistries

A porous substrate can be any porous material that is capable of covalent binding of probe biomolecules. Pores must be of a size that is sufficiently large to allow passage of fluorescently labeled target biomolecules and to maintain voltage across the substrate assembly. Yet, the pores must be sufficiently small to prevent the rapid escape of targets past the probes without significant hybridization or binding. The substrate can be of any configuration as long as it can be sealed into the bottom of the wells. Preferably, the substrate is a porous film. For example, in one embodiment, the porous substrate is high-density polyethylene with a 16 $\mu$m–18 $\mu$m pore diameter and a thickness of 4 mm.

A porous substrate may be a chemically inert polymeric material comprising a carbon backbone with various elemental substituents including, but not limited to, hydrogen, carbon, oxygen, fluorine, chlorine, bromine, sulfur and nitrogen. Representative polymers include, but are not limited to, polypropylene, polyethylene, polybutylene, polyisobutylene, polybutadiene, polyisoprene, polyvinylpyrrolidone, polytetrafluoroethylene, polyvinylidene difluoride, polyfluoroethylene-propylene, polyethylenevinyl alcohol, polymethylpentene, polychlorotrifluoroethylene, polysulfones, and blends of copolymers thereof.

Such inert polymers may be surface-activated (or modified) in such a way that external chemical species become adsorbed onto the surface of the polymer, whereby the chemical species are capable of chemically linking biopolymers and biomonomers to the surface of the polymer. Preferably, the chemical linking is via a nucleophile, and most preferably, the nucleophile is on the surface of the modified polymer.

For example, U.S. Pat. No. 5,583,211, assigned to the assignee of the present invention and incorporated herein in its entirety, describes surface activation (amination) of an inert polymeric substrate by radio frequency plasma deposition (RFPD). Surface amines of aminated polymeric substrates may be further converted to carboxyl groups by reacting with a cyclic anhydride, e.g. succinic anhydride. Alternatively, inert porous polymers may be coated with co-polymers, such as methacrylic acid or methacrylates to provide carboxyl groups. Carboxyl groups may also be introduced directly onto inert polymeric and non-polymeric surfaces, such as metallic or silica surfaces, by chemical vapor deposition processes or by utilizing silane linkers as disclosed in co-pending application (1994-045), filed Apr. 23, 2002, titled "Polymer-Coated Substrates for Immobilization of Biomolecules and Cells." In one embodiment, the porous substrate is a material selected from a group consisting of: carboxylated polypropylene, carboxylated polyethylene, and carboxylated silane.

In a preferred embodiment, polymeric materials are derivatized to form pendant acyl fluoride functionalities. The acyl fluoride activation of polymeric supports fabricated of ethylene acrylic acid copolymers, ethylene methacrylic acid copolymers, or derivatized polypropylene has been described in U.S. Pat. Nos. 6,110,669 and 6,146,833 assigned to the assignee of the present invention and the relevant content of which is incorporated herein in its entirety by reference. Such acyl fluoride-activated polymeric substrates have been successfully used to attach amine-modified oligonucleotides (U.S. Pat. Nos. 6,110,669 and 6,146,833) as well as unmodified biopolymers such as cDNA (U.S. Pat. No. 6,268,141 B1) and protein reagents. The relevant content of the U.S. Pat. No. 6,268,141 B1 is incorporated herein in its entirety by reference.

The successful application of acyl fluoride chemistry to substrate activation for biomolecule attachment can be attributed to unique physical and chemical properties of fluorine. It has properties distinctively different from other halogens and out of line with the trend in the halogen group of the Periodic Table. For example, while being the most electronegative element, due to its small size and resulting strong repulsion between the valence electrons, fluorine has electron affinity lower than that of chlorine. The incorporation of fluorine into carbon-containing moieties, such as acyls, brings about significant changes in their chemical activity and reaction kinetics.

Due to the singular way the fluorine atom shares electrons in the carbon-fluorine bond, as well as its relative size and ionization energy, acyl fluorides, unlike other acyl halides, are selective towards nitrogen nucleophiles over competing species. The acyl fluorides are less reactive toward neutral oxygen nucleophiles, such as water or alcohols (Carpino et al., supra at 271), and, therefore, are relatively resistant to water. The low reactivity of acyl fluoride with water leads to a great storage stability of acyl-fluoride-activated substrates, even under humid conditions. On the contrary, other acyl halides readily react with trace amounts of water in the air, which hinders the long-term storage of halide-acyl-activated polymeric substrates.

Additionally, the small size of the fluorine atom obviates steric hindrance in the formation of an amide bond. On the contrary, other reactive groups, including other halogens, often create steric hindrance and, thus, slow down the reaction. The specific reactivity of acyl fluorides for their targets, combined with their stability under aqueous conditions, makes acyl fluoride activation chemistry highly desirable in applications requiring the covalent attachment of biomolecules to activated supports.

Acyl fluoride activation involves treating carboxyl groups with a fluoridating agent to convert them into acyl fluoride groups. Suitable reagents for converting carboxyl groups into acyl fluoride groups broadly include carboxyl reactive fluoridating reagents. A most preferred reagent is (diethylaminosulphur) trifluoride (DAST). Other suitable reagents include cyanuric fluoride and tetramethylfluoroformadinium hexafluorophosphate. In one embodiment, a carboxylated polymeric substrate is rinsed in a solvent to remove moisture and to dry the substrate. Then, DAST in an anhydrous solvent (~10% v/v) is applied to the polymeric substrate. The substrate is incubated for 1–3 hours at an ambient temperature in a dry, closed container. Then, the substrate is rinsed in a solvent and dried.

Substrate-linked acyl fluorides, although relatively unreactive with water, readily and selectively react with nucleophiles such as amino-, primary or secondary amine-, and hydroxyl-containing species with a formation of a covalent bond. Therefore, acyl fluoride functionality allows for the rapid immobilization of amino-modified and unmodified biomolecules to the solid-phase support. This can represent significant cost savings since the modification of nucleic acids (e.g., 5'amino) is a fairly expensive process.

The nucleophile-containing species or ester-containing species are covalently attached to the acyl fluoride-activated porous substrate of the present invention by contacting them under a condition sufficient for allowing the attachment of these species to the substrate. A condition is sufficient if it allows the molecules to react with pendant acyl fluoride groups to form a covalent bond.

In accordance with one embodiment of the present invention, cDNA was immobilized on an activated porous film. The step of contacting the polynucleotides with the coated substrate is accomplished in the presence of an aqueous buffer, preferably with a neutral or basic pH. For the purpose of the present invention, a basic pH condition is a condition that has a pH greater than 8. A basic pH condition is sufficient if it allows the attachment of the polynucleotides to the solid support. In accordance with one embodiment of the present invention, the basic pH condition of the present invention has a pH of about 9 to 12. It should be understood that the basic pH condition may vary, depending on the method used. One skilled in the art can readily ascertain the basic pH condition of a particular attachment reaction in view of the disclosure of the present invention.

The activated substrate of the present invention may be contacted with nucleophile-containing or ester-containing species by methods that are known in the art. For example, the contacting step may be carried out by jet printing, solid or open capillary device contact printing, microfluidic channel printing, silk screening, and a technique using printing devices based upon electrochemical or electromagnetic forces. Alternatively, the contacting step may be carried out by manual spotting the biomolecules or cells on the activated substrate.

It should be understood that the activated porous substrates of the present invention may be exposed to nucleophile-containing or ester-containing species, including biomolecules, by any methods as long as the molecules are put in contact with the substrate. It should also be understood that other aqueous buffer systems, which are not explicitly described here, may also be used in the present invention as long as the buffer system provides a sufficient condition that allows the attachment of molecules to the substrate.

In accordance with embodiments of the present invention, the concentration of molecules contained in aqueous solutions may vary, depending on the type of molecule, its size, structure, and other factors that may influence the solubility of the molecules. For example, when the attached polymers are polynucleotides, preferably they are in the range of 5 nM to 40 $\mu$M. More preferably, they are in the range of 5 nM to 5 $\mu$M. Those skilled in the art will appreciate that an optimization of the coupling process may also include variation in buffer (ink) conditions, time, temperature, humidity, and type of printing device used. Such optimization can be easily performed based on the teachings of the instant disclosure.

In one embodiment, the probe biomolecules are attached to discrete locations on the top surface of the porous substrate, whereby an array is formed. In accordance with the present invention, this can be accomplished manually by applying a predetermined amount of biomolecule solution to a preselected location on the substrate. Alternatively, thermal inkjet printing techniques utilizing commercially available jet printers and piezoelectric microjet printing techniques, as described in U.S. Pat. No. 4,877,745, can be utilized to spot selected surface sites of the substrate with selected biomolecules. In a preferred embodiment, array densities of 100–400 probes per well are achieved with a high-resolution precision printer, such as the PS 7200 model manufactured by Cartesian, Inc. (Irvine, Calif.). Other manufactures of microarray printing device applicable here include PE-Packard BioSciences (Meriden, Conn.) or GeneMachines (San Carlos, Calif.).

2. Conductive Layer

Referring to FIG. 3, the conductive layer 2 may be either chemically bonded or physically attached to the bottom side of the porous substrate 1. For example, one side of the substrate may be metallized via plasma deposition process or painted with a conductive material. Various printing technologies, such as silk screening, may be used to create a pattern of electrodes on the substrate.

Commercially available metallized porous substrates, such as ROTRAC® Capillary Pore Membrane from Oxyphen (Ann Arbor, Mich.), may also be used. However, when using pre-fabricated metallized porous substrates, the DAST activation process must be modified to prevent secondary metal-mediated (catalytic) reactions, delamination, and other undesired effects.

Figure 4:
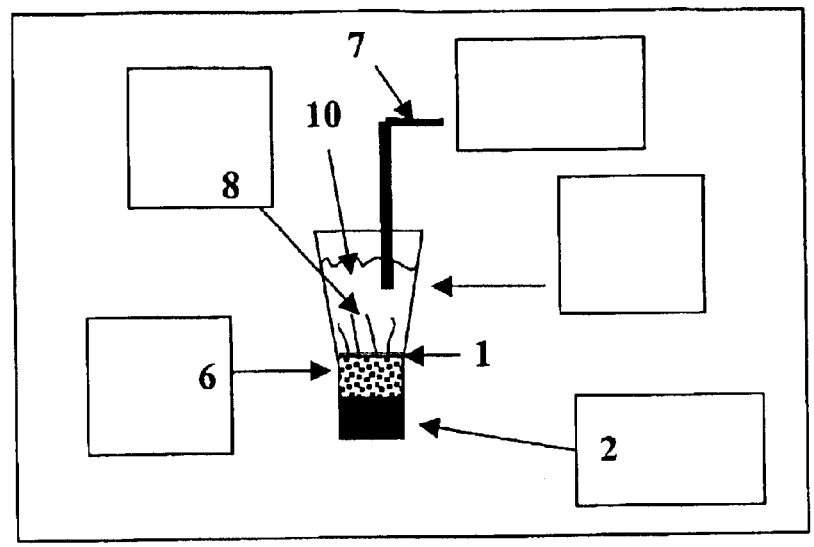
FIG. 4 shows an assembly of a porous substrate, permeation layer, and a conductive layer sealed into the bottom of a well in accordance with one embodiment of the present invention.

In one embodiment shown in FIG. 4 (only one well of a microplate is shown), the assembly of a porous substrate and a conductive layer further includes a permeation layer 6 disposed between the bottom surface of the porous substrate 1 and the conductive layer 2. Such permeation layer permits the transport of relatively small charged entities through it, but precludes large charged entities, such as DNA, from contacting the conductive layer 2 directly. The permeation layer further serves to avoid the strong, non-specific adsorption of DNA to electrodes. Examples of suitable materials for constructing the permeation layer include, but are not limited to, conductive polymer adhesives and hydration networks that support conductivity such as agaroses (for example, glyoxyl agarose, described by Cheng et al, Nature Biotech. 16, 541–546, 1998 and cross-linked co-polymers, such as methacrylates or acrylamides.)

3. Microplate Construction

The microplate of the present invention is constructed by sealing an assembly of a porous substrate and a conductive layer into the bottom of at least some wells of a microplate. FIG. 4 shows one well of a microplate constructed according to one embodiment of the present invention. The assembly is placed in such a way into the well that the conductive layer is available to receive voltage. For the purpose of the present invention, "sealing the assembly" means any process that allows for physically isolating the conductive layer from the bulk solution.

Figure 7:
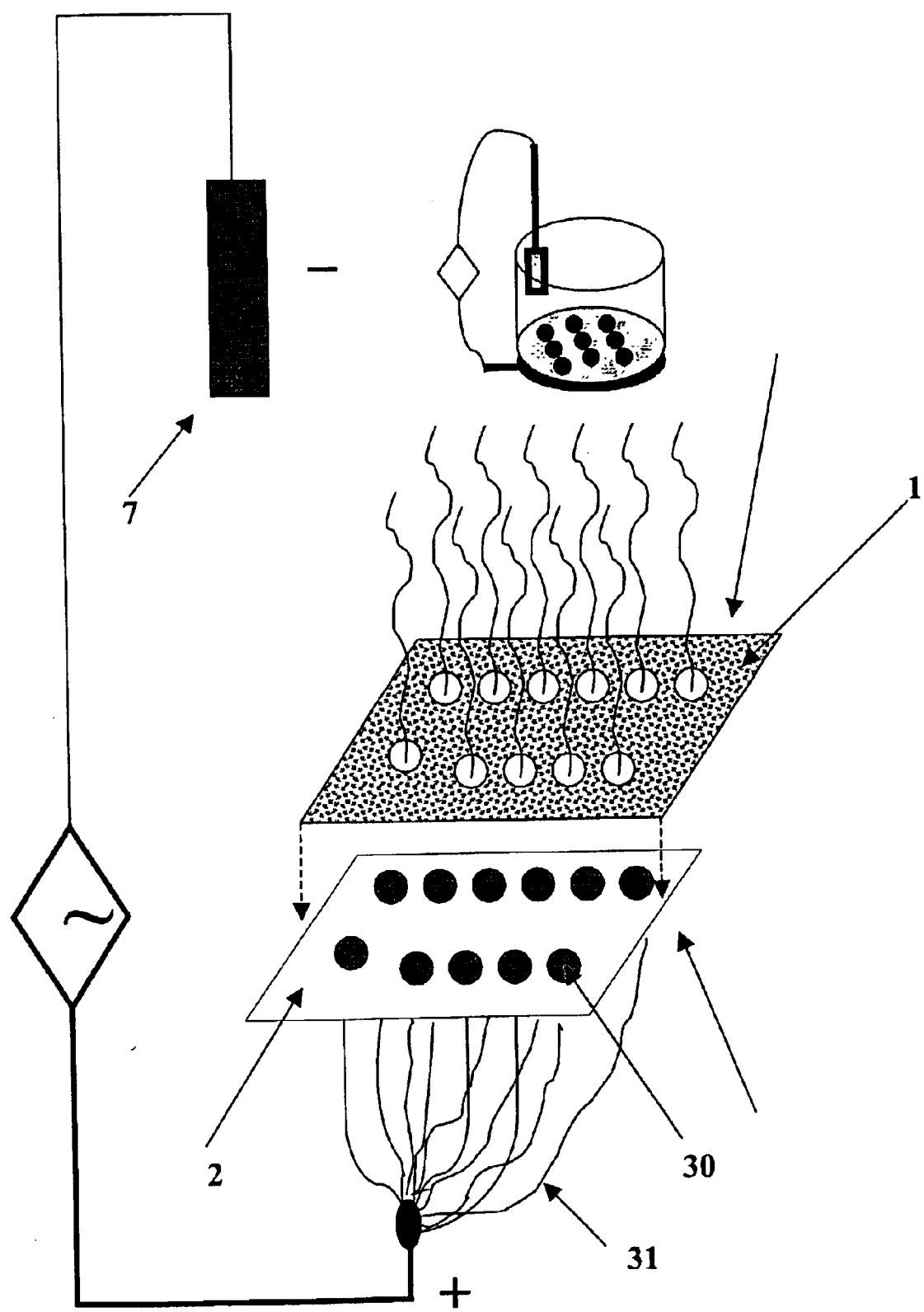
FIG. 7 depicts an assembly of a microplate comprising a network of electrode patches and a power supply comprising a matching network of electrical leads in accordance with one embodiment of the present invention.

Accordingly, in one embodiment, shown in FIG. 7, the electrode comprises a plurality of electrode patches and forms the bottom of the microplate. A porous substrate is "glued" or "laminated" to the electrode using a conductive polymer. The bottom of the microplate is affixed to a top portion of the microplate having bottomless wells. When assembled, the well pattern of the microplate matches the locations of the electrode patches.

Figure 5:
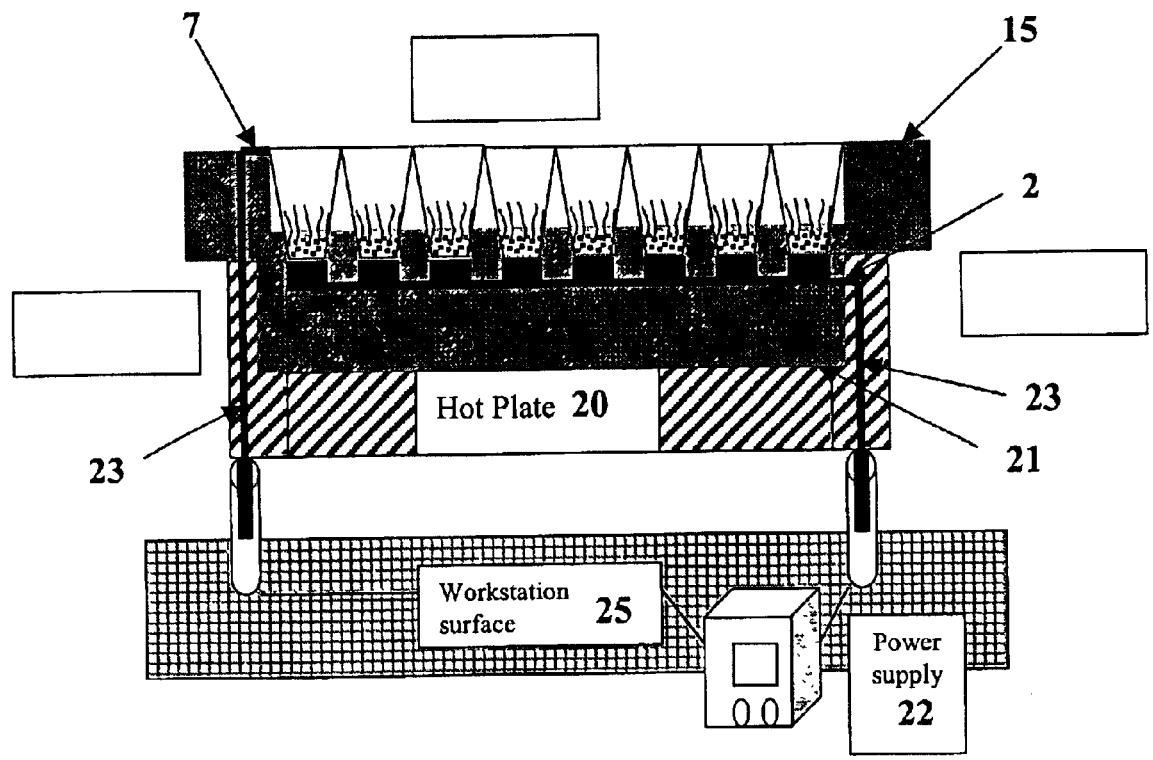
FIG. 5 shows an assembly of a microplate and a hot plate power supply in accordance with one embodiment of the present invention.

Alternatively, as shown, for example in FIGS. 4 and 5, some wells of a microplate may be filled with a conductive monomer and, then, the porous substrate may be placed into the wells, on top of the conductive monomer. The conductive monomer is polymerized in place forming the conductive microplate. In either embodiment, the microplate may have a standard 96- to 384-well format.

Generally, the assembly of a porous substrate and a conductive layer may be sealed into the bottom of the wells by physical entrapment (e.g. sandwiching between the top portion and the bottom of a microplate, encapsulation, lamination or polymerization.

The porous substrate may be coated with a conductive layer. Alternatively, the conductive layer may be adsorbed into the substrate or polymerized or by other means permanently affixed to one side of the substrate. The conductive layer may also be in the form of a sealant for affixing the membrane and electrode.

In summary, the present invention provides a novel method of forming a conductive microplate. The method comprises:

(a) providing a porous substrate with a top surface and a bottom surface;
(b) activating the top surface with reactive functional groups capable of covalent attachment of probe biomolecules;
(c) contacting the top surface with probe biomolecules under conditions sufficient for the covalent attachment of probe biomolecules to reactive functional groups;
(d) attaching a conductive layer to the bottom surface of the porous substrate; and
(e) sealing the porous substrate with the conductive layer into the bottom of at least some wells of the microplate, wherein the conductive layer is adapted to receive voltage.

In the preferred embodiment, the contacting step (c) comprises contacting the probe biomolecules at discrete locations on the porous substrate, whereby a bioarray is formed.

Referring to FIGS. 4 and 8, in one embodiment, the conductive layer 2 forms a first electrode and the microplate further comprises a second electrode 7 in an electrical contact with the first electrode. Preferably, the second electrode is positioned externally to the porous support surface. The electrical contact between the first and the second electrode is effectuated by an electrolyte solution 10. The polarity of the first and the second electrodes could be switched or alternated depending upon the type of species (positive vs. negative ion) to be attracted to the porous substrate surface.

Referring to FIG. 9, once the microplate is assembled, labeled target biomolecules are applied to the electrolyte solution and the electrical current applied across the electrodes to facilitate electrophoretic transfer to the substrate surface and to promote the binding of the target biomolecules 9 to probe biomolecules 4.

Therefore, in another aspect, the present invention provides a method for hybridizing target biomolecules to probe biomolecules. The method comprising:

(a) providing the conductive microplate of the present invention, wherein the conductive layer forms a first electrode and the microplate further comprises a second electrode in an electrical contact with the first electrode through an electrolyte solution;
(b) introducing labeled target biomolecules into the electrolyte solution; and
(c) applying an electrical voltage between the first and the second electrode, whereby the labeled target biomolecules hybridize with the probe biomolecules on the surface of the porous substrate.

4. Power Supply

The microplate of the present invention may be assembled with a power supply for supplying voltage to the first and the second electrodes. While convention power supplies are suitable, the microplate of the present invention can be adapted for use with a robotic platform.

In one embodiment, shown in FIG. 5, a hot (electronically active) plate 20 is used as a power supply. The hot plate power supply comprises a surface 21 adapted to accept the microplate 15 and a power source 22 providing voltage to the first 2 and the second 7 electrodes via means 23.

In the embodiment shown in FIG. 5, the means 23 for supplying voltage are electrical leads (shown with the same reference numeral 23) incorporated into the hot plate surface. The leads mate with the first electrode 2 and the second electrode 7 of the microplate when the microplate is positioned on the surface 21 of the hot plate and provide voltage to the electrodes.

A hot plate power supply may reside on a robotic workstation 25 so that when the microplate is placed onto it, the hot plate provides voltage to drive electrophoresis. Alternatively, a robotic arm tool may be used (not shown). When the robotic arm tool contacts a microplate, power for electrophoresis is supplied. If electrophoretic hybridization is fast enough, a charged robotic arm tool could simply move from one plate to another on the work surface.

In another embodiment shown in FIGS. 7–9, the first electrode comprises a network of electrode patches 30 sealed into the base of individual wells and the power supply comprises a matching network of electrical leads 31. The assembly further comprises a second electrode 7 exposed to the bulk sample solution 10. When the microplate is assembled, the electrode patches 30 and electrical leads 31 mate directly by physical contact or indirectly through a conductive media and a voltage is transmitted from the electrical leads to electrode patches. The voltage is provided through the leads from the power supply to the patches.

Alternatively, the network of electrical leads 31 may be incorporated into a hot plate (not shown). In this embodiment, when the microplate is positioned on the surface 21 of the hot plate, the electrode patches 30 and electrical leads 31 mate directly by physical contact or indirectly through a conductive media and a voltage is transmitted from the electrical leads to the electrode patches.

Figure 10:
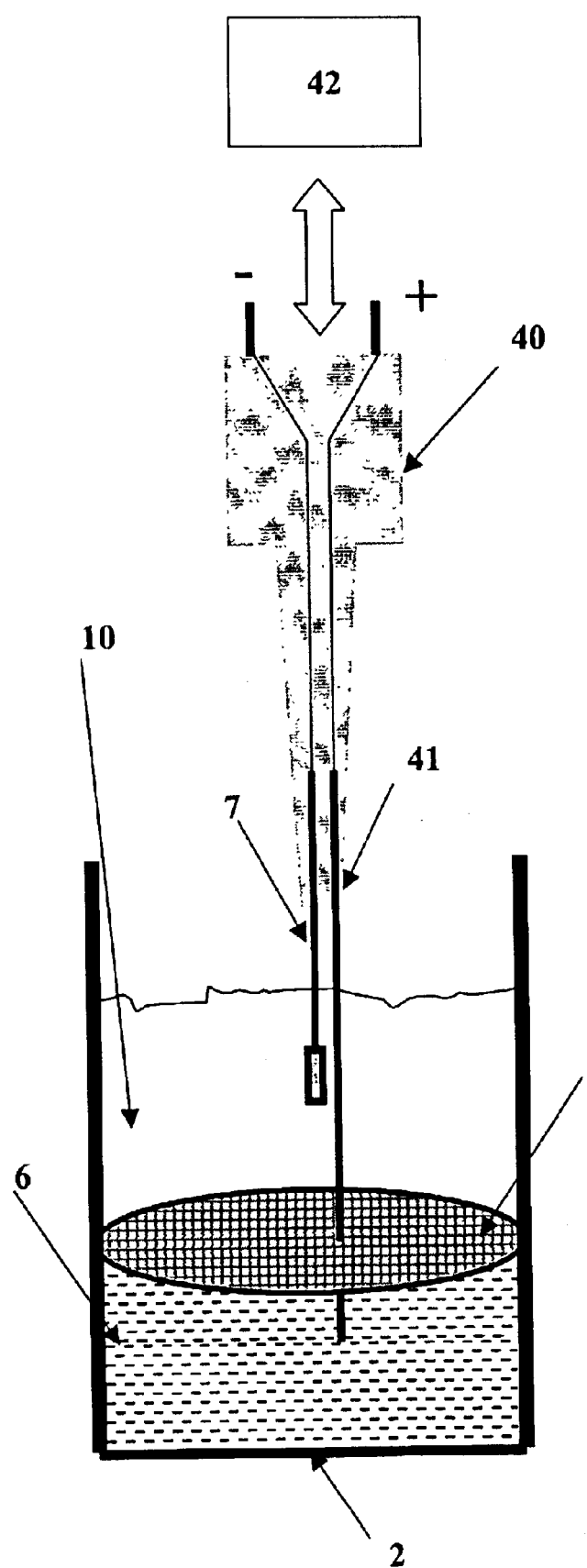
FIG. 10 shows a microplate assembly with an electrode prong tool in accordance with one embodiment of the present invention.

Also, the means for supplying voltage may comprise electrode prong tools 40 as shown in FIG. 10. The electrode prong tool 40 may include one electrode 41 in an electrical contact with the conductive layer 2 and another electrode 7 exposed to the bulk solution 10. The electrode 41 may be pierced through the top of the porous substrate 1 (the side facing the bulk solution). The electrode 41 may be in either direct contact with the conductive layer 2 or may contact the conductive layer 2 via a permeation layer 6. Either embodiment may be carried out by using an electrode prong tool 40 that mates with a robotic arm device 42 such as Biomek with power supplied and controlled by the robotic liquid handler. When the robotic arm contacts a microplate, power for electrophoresis is supplied. If electrophoretic hybridization is fast enough, a charged robotic arm tool could simply move from one plate to another on the work surface.

The following examples are intended to illustrate, but not to limit, the scope of the invention. While such examples are typical of those that might be used, other procedures known to those skilled in the art may alternatively be utilized. Indeed, those of ordinary skill in the art can readily envision and produce further embodiments, based on the teachings herein, without undue experimentation.

EXAMPLES

Example 1
Activating Porous Substrate

Polypropylene substrate was surface functionalized with amine groups using a glowing gas chemical plasma process employing radio frequency plasma deposition or RFPD under conditions described in the commonly assigned U.S. Pat. No. 5,583,211. Surface amines were converted to carboxyl groups using succinic anhydride. The support was rinsed in solvent to remove moisture and allowed to dry. DAST reagent in anhydrous solvent (~10% v/v) was applied to the support and incubated for 1–3 hours at ambient temperature in a dry, closed container. After the incubation, the support was rinsed in solvent and dried. Acyl fluoride-activated substrate was stored dry at −20° C. until needed.

Example 2
Covalent Attachment of Probe DNA to the Activated Substrate

A solution of cDNA (20 nL of 1 nM stock solution in 50 mM sodium carbonate-bicarbonate buffer, pH 9) was printed on the surface of activated porous substrate prepared in accordance with Example 1. The printing was conducted using a Biomek 384-pin HDRT (high-density replicating tool). The printing was carried out without any modification of the cDNA. The cDNA-printed spots were allowed to react with the substrate for 1 hour in a humidified chamber held at 25° C. Active fluoride groups remaining on the surface were quenched in ethanol for 2 hours at ambient temperature. Biotin-labeled cDNA targets of actin, G3PDH, and TNF (e.g., 1 $\mu$l of a 41 nM stock solution diluted to a final volume of 150 $\mu$L; 41 fmoles applied ~246×108 molecules) were hybridized (1 hour, 60° C., 2×SSC, 0.01% SDS) to the microarray. Subsequently, streptavidin-alkaline phosphatase conjugate was applied following rinsing; and signal was developed using ELF reagent (Molecular Probes, Inc.) with detection under a cooled CCD camera.

Figure 6:
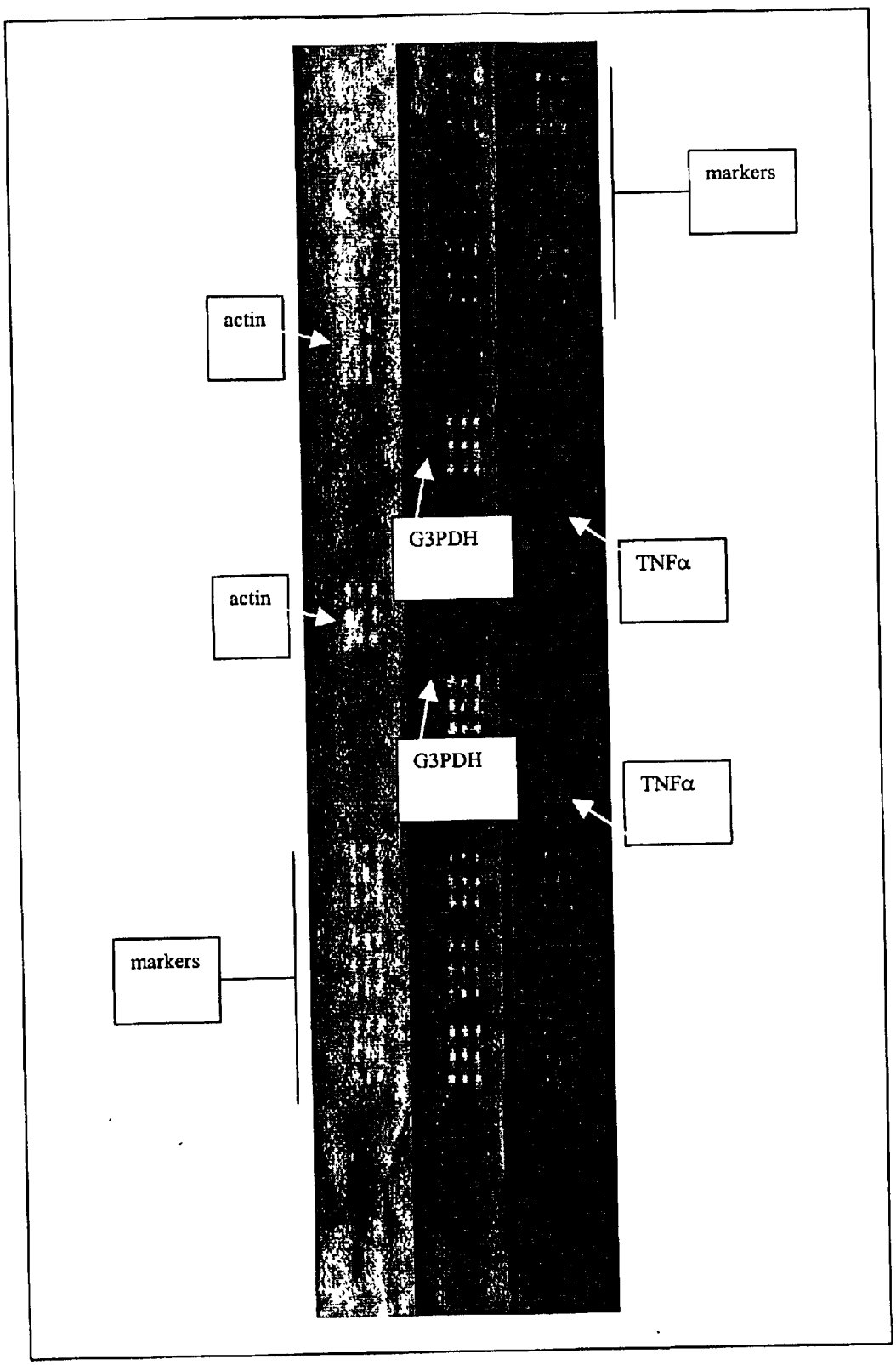
FIG. 6 shows passive hybridization of labeled cDNA targets to cDNA probes immobilized on an activated porous film substrate.

The results, shown in FIG. 6, demonstrate the ability of the activated substrates of the present invention to specifically hybridize the complementary cDNA targets (actin, G3PDH and TNF). Therefore, the activated substrates of the present invention can be used for the covalent attachment of unmodified probe biomolecules.

Example 3
Electrophoresis Assisted Hybridization

A porous membrane strip of ultra-high molecular weight polyethylene with cDNA probes immobilized on one side was mounted near the positive electrode of a slab gel electrophoresis apparatus. The strip was soaked with denaturant (0.5 M NaOH, 0.15 M NaCl) and incubated for 15 minutes. Residual denaturant was removed from the strip, which was then rinsed, and the electrophoresis apparatus flooded with running buffer (1×TBE). Target cDNA (actin) was boiled, then placed on ice and subsequently mixed with gel loading buffer (Digene Corp., Betsville, Md.) containing running dye. The cDNA target solution was placed approximately 0.5 cm away from the porous strip. Voltage was applied across the strip (274 V, 122 mA) and maintained for 5 minutes after the dye front had reached the strip. Power was turned off and hybridization was allowed to proceed for 5 minutes. The strip was removed from the apparatus and the signal developed using streptavidin-alkaline phosphatase together with a chemiluminescent reagent, APS-5 (Lumigen, Southfield, Mich.). Following 3×5 minute rinses in 2×SSC, 0.01% SDS, the ELF reagent (Molecular Probes, Eugene, Oreg.) was used to develop a fluorescent signal. Both the chemiluminescent and fluorescent signals were detected using a CCD camera system. Fluorescent and chemiluminescent spots were detected that corresponded to specific hybridization of actin target to the complementary actin probe. In addition, smears of non-specific signal were observed moving across the membrane from bottom to top edge suggesting further concentration of target cDNA actin on the membrane had occurred during electrophoresis. This experiment demonstrates rapid and specific capture of labeled cDNA targets following electrophoretically facilitated concentration of the targets near complementary probes covalently attached to the membrane.

While the foregoing has been described in considerable detail and in terms of preferred embodiments, these are not to be construed as limitations on the disclosure or claims to follow. Modifications and changes that are within the purview of those skilled in the art are intended to fall within the scope of the following claims.

What is claimed is:

1. A conductive microplate for detecting target biomolecules in a sample, the microplate with a plurality of wells, the microplate comprising:

an assembly of a porous substrate and a conductive layer, wherein the assembly is sealed into bottom of at least some wells, wherein the porous substrate has a top surface and a bottom surface, the top surface comprises a plurality of covalently attached probe biomolecules, wherein the probe biomolecules are reactive with target biomolecules, wherein the probe biomolecules are attached at discrete locations on the top surface of the porous substrate, whereby an array is formed, the conductive layer is attached to the bottom surface of the porous substrate, and the conductive layer is adapted to receive voltage.

2. The microplate of claim 1, wherein the top surface further comprises a plurality of activated pendant functional groups reactive with probe biomolecules; and the top surface further comprises a plurality of probe biomolecules covalently bound to the pendant functional groups.

3. The microplate of claim 2, wherein the activated pendant functional groups are acyl fluoride groups.

4. The microplate of claim 3, wherein the probe biomolecules are attached to the top surface of the porous substrate without modification.

5. The microplate of claim 1, wherein the array in each well comprises from about 100 to about 400 probe biomolecules.

6. The microplate of claim 1, wherein
the conductive layer forms a first electrode and the microplate further comprises:
a second electrode in an electrical contact with the first electrode.

7. The microplate of claim 6, wherein the electrical contact between the first and the second electrode is effectuated by an electrolyte solution.

8. The microplate of claim 1, wherein the conductive layer is attached directly to the bottom surface of the porous substrate.

9. The microplate of claim 8, wherein the conductive layer is a metallic coating.

10. A conductive microplate with a plurality of wells for detecting target biomolecules in a sample, the microplate comprising:
an assembly comprising a porous substrate, which has a top surface and a bottom surface, a conductive layer, which is adapted to receive voltage, and a permeation layer disposed between the bottom surface of the porous substrate and the conductive layers,
wherein the assembly is sealed into bottom of at least some wells and the to surface of the porous substrate comprises a plurality of covalently attached probe biomolecules, wherein the probe biomolecules are reactive with target biomolecules.

11. The microplate of claim 10, wherein the permeation layer comprises a conductive material selected from a group consisting of agaroses and cross-linked polymers.

12. The microplate of claim 11, wherein the permeation layer comprises a methacrylate.

13. The microplate of claim 1, wherein the porous substrate is prepared from a material that comprises pendant carboxyl groups.

14. The microplate of claim 13, wherein the porous substrate is selected from a group consisting of carboxylated polypropylene, carboxylated polyethylene, and polycarbonates.

15. The microplate of claim 1, wherein the porous substrate is prepared from a material that comprises a coating having pendant carboxyl groups.

16. The microplate of claim 1, wherein the porous substrate has pores with a diameter of 16 to 18 $\mu$m.

17. The microplate of claim 1, wherein the microplate comprises from 96 to 384 wells.

18. The microplate of claim 1, wherein the probe and the target biomolecules are selected from a group consisting of: nucleic acids, polynucleotides, polypeptides, proteins, carbohydrates, lipids, and analogs thereof.

19. The microplate of claim 18, wherein the biomolecule is a polynucleotide selected from a group consisting of amplified DNA, cDNA, single-stranded DNA, double-stranded DNA, PNA, RNA, or mRNA.

20. A device comprising the microplate of claim 6 and a power supply for supplying voltage to the first and the second electrodes.

21. The device of claim 20, wherein the power supply is a hot plate comprising:
a surface adapted to accept the microplate;
a power source; and
means for supplying voltage from the power source to the first and the second electrodes of the microplate.

22. The device of claim 21, wherein the means for supplying voltage comprise leads incorporated into the hot plate, wherein the leads mate with the first and the second electrodes of the microplate when the microplate is positioned on the surface of the hot plate.

23. The device of claim 21, wherein the first electrode comprises a network of electrode patches sealed into the base of individual wells and the hot plate comprises a matching network of electrical leads such that a voltage is transmitted from the electrical leads to electrode patches when the microplate is positioned on the surface of the hot plate.

24. A conductive microplate with a plurality of wells for detecting target biomolecules in a sample, the microplate comprising:
an assembly of a porous substrate, a conductive layer forming a first electrode, a second electrode in an electrical contact with the first electrode, and a power supply for supplying voltage to the first and the second electrodes, wherein:
the assembly is sealed into bottom of at least some wells,
the porous substrate has a top surface and a bottom surface,
the top surface comprises a plurality of covalently attached probe biomolecules that are reactive with target biomolecules,
the conductive layer is attached to the bottom surface of the porous substrate,
the first electrode comprises a network of electrode patches sealed into the base of individual wells and the power supply comprises a matching network of electrical leads such that when the microplate is assembled the electrode patches mate with the matching electrical leads.

25. A device comprising microplate of claim 1 and a robotic arm supplying voltage to the conductive layer, the device comprises an electrode prong tool having one electrode in an electrical contact with the conductive layer.

26. The device of claim 25, further comprising a second electrode in electrical contact with the first electrode through an electrolyte solution.

27. The device of claim 25, wherein the first electrode is pierced through the porous substrate.

28. A method of forming a conductive microplate having a plurality of wells, the method comprising:
(a) providing a porous substrate with a top surface and a bottom surface;
(b) activating the top surface with reactive functional groups capable of covalent attachment of probe biomolecules;
(c) contacting the top surface with probe biomolecules at discrete locations on the porous substrate under conditions sufficient for covalent attachment of probe biomolecules to reactive functional groups, whereby a bioarray is formed;

(d) attaching a conductive layer to the bottom surface of the porous substrate; and (e) sealing the porous substrate with the conductive layer into bottom of at least some wells of the microplate, wherein the conductive layer is adapted to receive voltage.

29. The method of claim 28, wherein the contacting step (c) is carried out by a technique selected from a group consisting of jet printing, solid or open capillary device contact printing, microfluidic channel printing, silk screening, and a technique using printing devices based upon electrochemical or electromagnetic forces.

30. The method of claim 28, wherein the attaching step (d) is carried out by a technique selected from a group consisting of silk screening, chemical deposition of metal, gluing, lamination, encapsulation, and polymerization.

31. A method for hybridizing target biomolecules to probe biomolecules, the method comprising:

(a) providing the conductive microplate of claim 7;

(b) introducing labeled target biomolecules into the electrolyte solution; and (c) applying an electrical voltage between the first and the second electrode, whereby the labeled target biomolecules hybridize with the probe biomolecules on the surface of the porous substrate.

* * * * *